(12) United States Patent
Shinohara

(10) Patent No.: US 12,509,140 B2
(45) Date of Patent: Dec. 30, 2025

(54) ELECTRIC POWER STEERING DEVICE

(71) Applicant: NSK LTD., Tokyo (JP)

(72) Inventor: Shigeo Shinohara, Gunma (JP)

(73) Assignee: NSK LTD., Tokyo (JP)

( * ) Notice: Subject to any disclaimer, the term of this patent is extended or adjusted under 35 U.S.C. 154(b) by 489 days.

(21) Appl. No.: 18/008,327

(22) PCT Filed: Aug. 31, 2021

(86) PCT No.: PCT/JP2021/031923
§ 371 (c)(1),
(2) Date: Dec. 5, 2022

(87) PCT Pub. No.: WO2023/032032
PCT Pub. Date: Mar. 9, 2023

(65) Prior Publication Data
US 2024/0253693 A1 Aug. 1, 2024

(51) Int. Cl.
*B62D 5/00* (2006.01)
*B62D 5/04* (2006.01)

(52) U.S. Cl.
CPC ......... *B62D 5/0454* (2013.01); *B62D 5/0403* (2013.01)

(58) Field of Classification Search
CPC .. B62D 5/0454; B62D 5/0403; B62D 5/0481; B62D 5/22; B62D 5/24
See application file for complete search history.

(56) References Cited

U.S. PATENT DOCUMENTS

| | | | |
|---|---|---|---|
| 2012/0204666 A1* | 8/2012 | Gotou | F16H 57/031 74/425 |
| 2018/0087982 A1* | 3/2018 | Arimura | C25D 5/36 |

FOREIGN PATENT DOCUMENTS

| | | | | |
|---|---|---|---|---|
| JP | 2001200912 A | * | 7/2001 | ............... B62D 5/00 |
| JP | 2006-076443 A | | 3/2006 | |
| JP | 2018-203135 A | | 12/2018 | |
| JP | 2019-089355 A | | 6/2019 | |
| JP | 2020-199926 A | | 12/2020 | |
| WO | 2020/157861 A1 | | 8/2020 | |

OTHER PUBLICATIONS

International Search Report for PCT/JP2021/031923 dated Sep. 28, 2021.
Japanese Office Action dated Jul. 8, 2025 in Application No. 2022-025017.

* cited by examiner

*Primary Examiner* — Zakaria Elahmadi
(74) *Attorney, Agent, or Firm* — Sughrue Mion, PLLC

(57) ABSTRACT

An electric power steering device includes an assist pinion shaft, a worm wheel attached to an end part on the Z2 side of the assist pinion shaft, a worm shaft that has shaft teeth meshing with wheel teeth, and a casing that houses the worm shaft and the worm wheel. Among a plurality of parts of the wheel teeth, a first part is a part that meshes with the shaft teeth, and a second part is a part located on the opposite side of the first part with a central axis interposed therebetween. The first distance from an end surface on the Z1 side of the first part to a tip end of a casing end part is greater than the second distance from an end surface on the Z1 side of the second part to a tip end of the casing end part.

4 Claims, 7 Drawing Sheets

ELECTRIC POWER STEERING DEVICE

This Application is a National Stage of International Application No. PCT/JP2021/031923 filed Aug. 31, 2021.

FIELD

The present disclosure relates to an electric power steering device.

BACKGROUND

The electric power steering device in Patent Literature 1 includes a pinion shaft, a worm wheel, a worm shaft, a housing, and a lid member (cover member). Specifically, the worm wheel is attached to an end part of the pinion shaft in the axial direction, and the worm wheel meshes with the worm shaft. The housing has a housing space that houses the pinion shaft, the worm wheel, and the worm shaft. The end part of the housing is opened, and the opening is covered by the lid member (cover member). Specifically, a mounting portion is provided on the end part of the housing, and when the lid member is attached to the mounting portion, the opening is covered by the lid member (cover member).

The lid member (cover member) faces the worm wheel, and is disposed substantially parallel to the worm wheel. The reason will be briefly described below. For example, the housing space and the mounting portion of the housing are sometimes formed by processing using a machine tool (for example, cutting processing). In this case, if the lid member is disposed substantially parallel to the worm wheel, the posture of the machine tool with respect to the housing will be the same as that for processing the housing space and that for processing the mounting portion, and the machining work can be carried out with ease.

CITATION LIST

Patent Literature

Patent Literature 1: Japanese Patent Application Laid-open No. 2020-199926

SUMMARY

Technical Problem

It has been desired to provide an electric power steering device smaller in size.

The present disclosure has been made in view of the problem described above, and an object of the present disclosure is to provide an electric power steering device smaller in size.

Solution to Problem

In order to achieve the above object, an electric power steering device according to an embodiment, comprising: a rack shaft that extends in a first direction, and an outer periphery of which is provided with rack teeth; an assist pinion shaft that extends in a second direction intersecting with the first direction, and an outer periphery of which on one side in the second direction is provided with pinion teeth that mesh with the rack teeth; a worm wheel attached to an end part on another side in the second direction of the assist pinion shaft, and an outer periphery of which is provided with wheel teeth; a worm shaft that has shaft teeth meshing with the wheel teeth, and that is rotated by a driving force of an electric motor; and a casing that houses the worm shaft and the worm wheel, and an inner peripheral side of a casing end part of which on the other side in the second direction is provided with an opening part, wherein among a plurality of parts of the wheel teeth, a first part is a part that meshes with the shaft teeth, and among the parts of the wheel teeth, a second part is a part located on an opposite side of the first part with a central axis of the assist pinion shaft interposed therebetween, and in a cross section including the central axis of the assist pinion shaft, the first part, and the second part, first distance from an end surface on the other side in the second direction of the first part to a tip end of the casing end part located on the first part side with respect to the central axis of the assist pinion shaft is greater than second distance from an end surface on the other side in the second direction of the second part to a tip end of the casing end part located on the second part side with respect to the central axis of the assist pinion shaft.

Thus, in the electric power steering device of the present disclosure, the first distance is greater than the second distance. In other words, the second distance is smaller than the first distance. In contrast, in Patent Literature 1, the second distance and the first distance are equal to each other. To reduce the size of the electric power steering device, it is preferable to dispose the tip end of the casing end part as low as possible (on one side in the second direction). However, in Patent Literature 1, the lid member (cover member) is disposed substantially parallel to the worm wheel, and the lid member (cover member) is brought close to the worm wheel as much as possible. Hence, in Patent Literature 1, it is difficult to further reduce the height of the housing. When a direction intersecting the first direction and the second direction is the third direction, in the present disclosure, the opening part is disposed in an inclined manner when viewed from the third direction, by making the height of the tip end of the casing end part on the second part side lower than that of the tip end of the casing end part on the first part side. Hence, it is possible to reduce the height of the casing than that in Patent Literature 1. Thus, in the present disclosure, it is possible to provide an electric power steering device smaller in size.

As a preferable aspect, a lid member that covers the opening part is provided on the casing end part of the casing, the casing end part of the casing includes an annular part that extends along an axial rotation direction of the central axis of the assist pinion shaft, and a flange that protrudes outwardly in a radial direction from the annular part, the lid member is attachable to the flange, among a plurality of parts of the annular part, the flange is disposed on a part excluding a third part, a fourth part, a fifth part, and a sixth part, and when viewed from the second direction, the third part and the fourth part are intersection parts of a first straight line that extends in the first direction through the central axis of the assist pinion shaft and the annular part, the fifth part overlaps with the first part, and the sixth part overlaps with the second part.

Thus, in the present disclosure, among the parts of the annular part of the casing, the flange provided on the annular part is disposed on a part excluding the third part, the fourth part, the fifth part, and the sixth part.

For example, it is assumed that a fastening member is used to attach the lid member to the flange. That is, for example, the lid member is attached to the flange using the fastening member, by fastening the fastening member to the flange after inserting the fastening member through a through hole on the lid member from the upper side (the other side in the second direction) of the lid member.

First, when viewed from the second direction, the fifth part overlaps with the first part, and the sixth part overlaps with the second site. If a flange is provided on the sixth part, among a plurality of parts on the upper surface of the lid member, the fastening member protrudes upward from the part corresponding to the sixth part. Hence, the height of the casing on the sixth part side and the second part side is increased by the protruding portion of the fastening member. Consequently, the fifth part and the sixth part are not desirable parts to dispose the flange.

Moreover, for example, various types of members such as a mounting member of the electric motor are disposed in the vicinity of the third part and the fourth part. Consequently, if a flange is provided on the third part or the fourth part, the flange may interfere with the mounting member and the like. Hence, the third part and the fourth part are not desirable parts to dispose the flange. In this manner, the flange is preferably disposed on a part excluding the third part, the fourth part, the fifth part, and the sixth part.

As a preferable aspect, the lid member includes a lid main body part that covers the opening part and an annular protrusion part that protrudes on the one side in the second direction from a peripheral part of the lid main body part, the protrusion part is disposed on an inner peripheral side of the casing end part, and an annular O-ring that extends in a peripheral direction is provided between an outer periphery of the protrusion part and the casing end part.

Thus, while the protrusion part is inserted into the inner peripheral side of the casing end part, the O-ring is provided between the protrusion part and the inner periphery of the casing. That is, the inner periphery of the casing and the protrusion part are sealed by a shaft seal of O-ring. In this process, it is also conceivable to apply a surface seal with an O-ring between the upper surface of the casing end part and the lid member. However, for example, if an upward (the other side in the second direction) force is applied to the lid member, the lid member slightly separates from the upper end part of the casing in the upward direction, thereby reducing the sealing effect of the surface seal. In this manner, as in the present disclosure, it is preferable to seal between the inner periphery of the casing and the protrusion part with the shaft seal of O-ring.

As a preferable aspect, when viewed from the first direction, an end on the one side in the second direction of the protrusion part intersects with an end surface on the other side in the second direction of the assist pinion shaft.

To reduce the size of the electric power steering device, it is preferable to dispose the lid member as low as possible (on one side in the second direction). Consequently, it is possible to further reduce the size of the electric power steering device, when the lower end (end on one side in the second direction) of the protrusion part intersects with the end surface (end surface on the other side in the second direction) on the upper side of the assist pinion shaft, when viewed from the first direction, as in the present disclosure, than when the lower end of the protrusion part does not intersect with the end surface on the upper side of the assist pinion shaft.

As a preferable aspect, the worm shaft is preferably located on the opposite side of the rack shaft, with the assist pinion shaft interposed therebetween. If the worm shaft is located on the rack shaft side with respect to the assist pinion shaft, the size of the electric power steering device may be increased because many parts are disposed on the rack shaft side in a concentrated manner. Consequently, it is possible to further reduce the size of the electric power steering device, by disposing the rack shaft on one side and disposing the worm shaft on the other side, with the assist pinion shaft interposed therebetween.

Advantageous Effects of Invention

According to the present disclosure, it is possible to provide an electric power steering device smaller in size.

DESCRIPTION OF EMBODIMENTS

Figure 1:
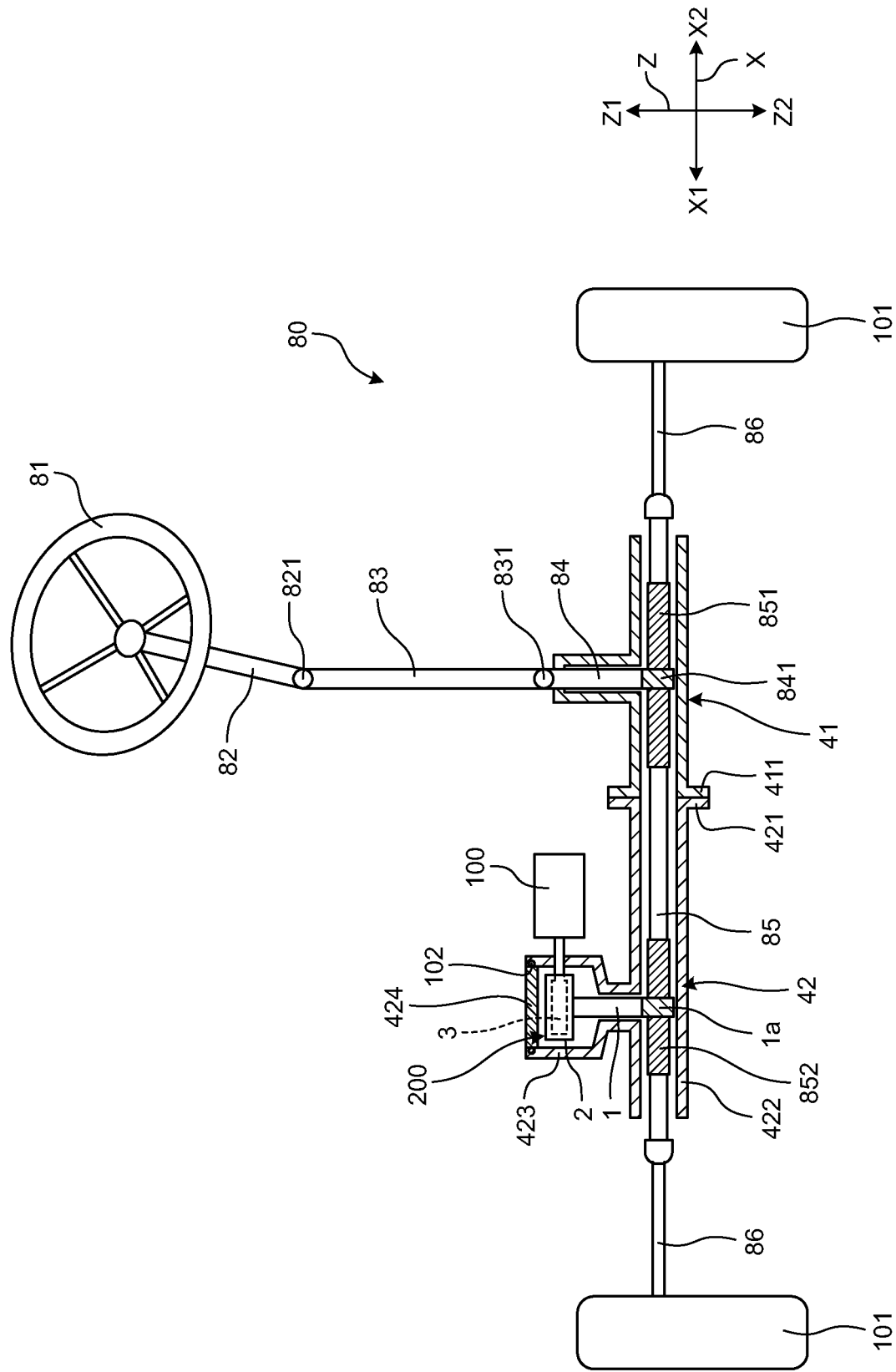
FIG. 1 is a schematic view of an electric power steering device according to an embodiment.

A mode for carrying out the present invention (embodiment) will be described in detail with reference to the drawings. The present invention is not limited by the contents described in the following embodiment. Moreover, the components described below include those that can be easily assumed by those skilled in the art and those that are substantially the same. Furthermore, the components described below can be appropriately combined with each other. Still furthermore, the same reference numerals denote the parts having the same structure, and the description thereof will be omitted. In the present embodiment, the X direction is referred to as a first direction, the Z direction is referred to as a second direction, and the Y direction is referred to as a third direction. The Z direction intersects the X direction. The Y direction intersects the X direction and the Z direction. Specifically, the Y direction (third direction) is a direction parallel to an upper surface 424c (see FIG. 5) of a lid member 424, which will be described below.

The angle between the X direction and the Z direction can be determined optionally. For example, the angle between the X direction and the Z direction may be a right angle, an acute angle, or an obtuse angle.

Figure 2:
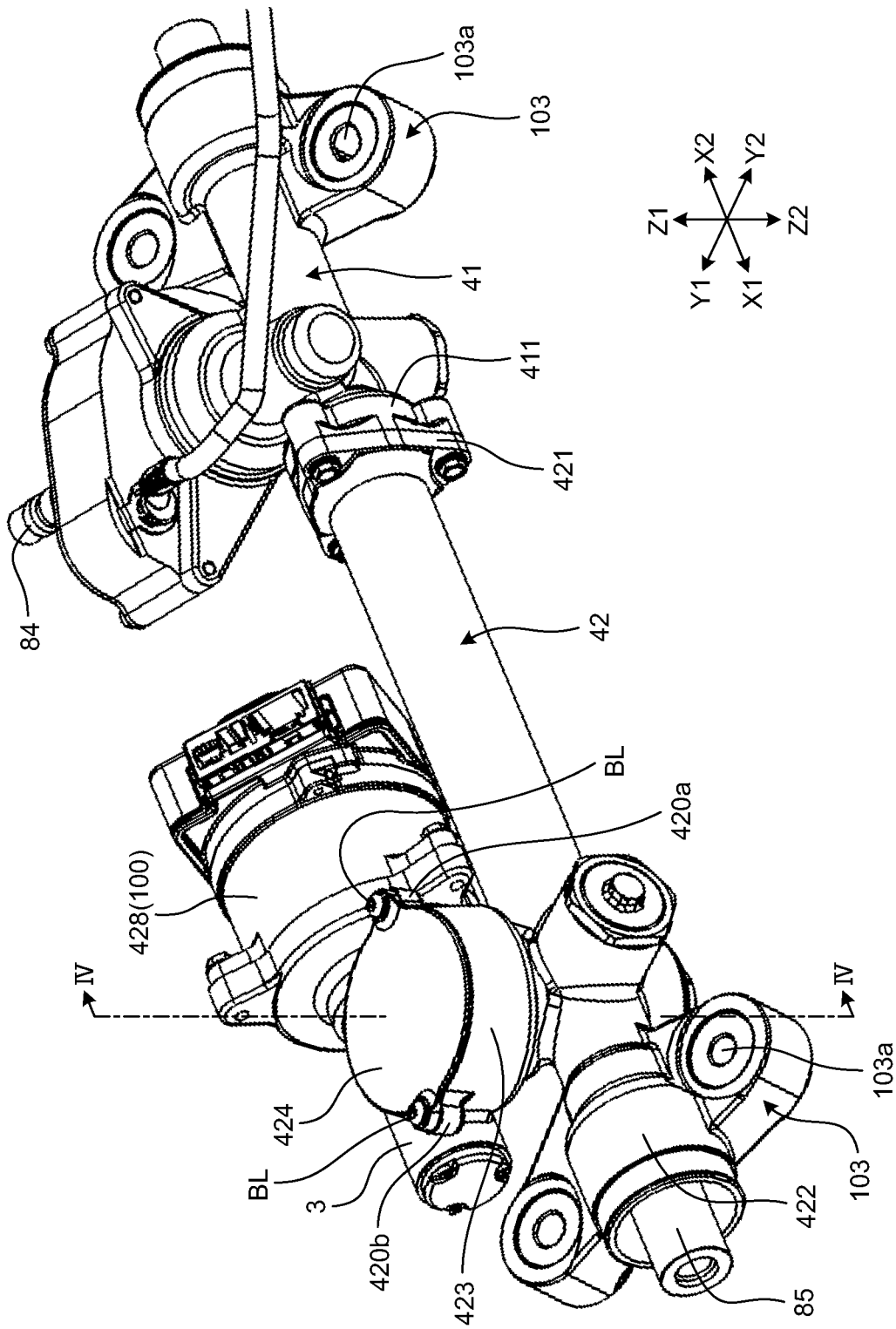
FIG. 2 is a partial perspective view of FIG. 1.
Figure 3:
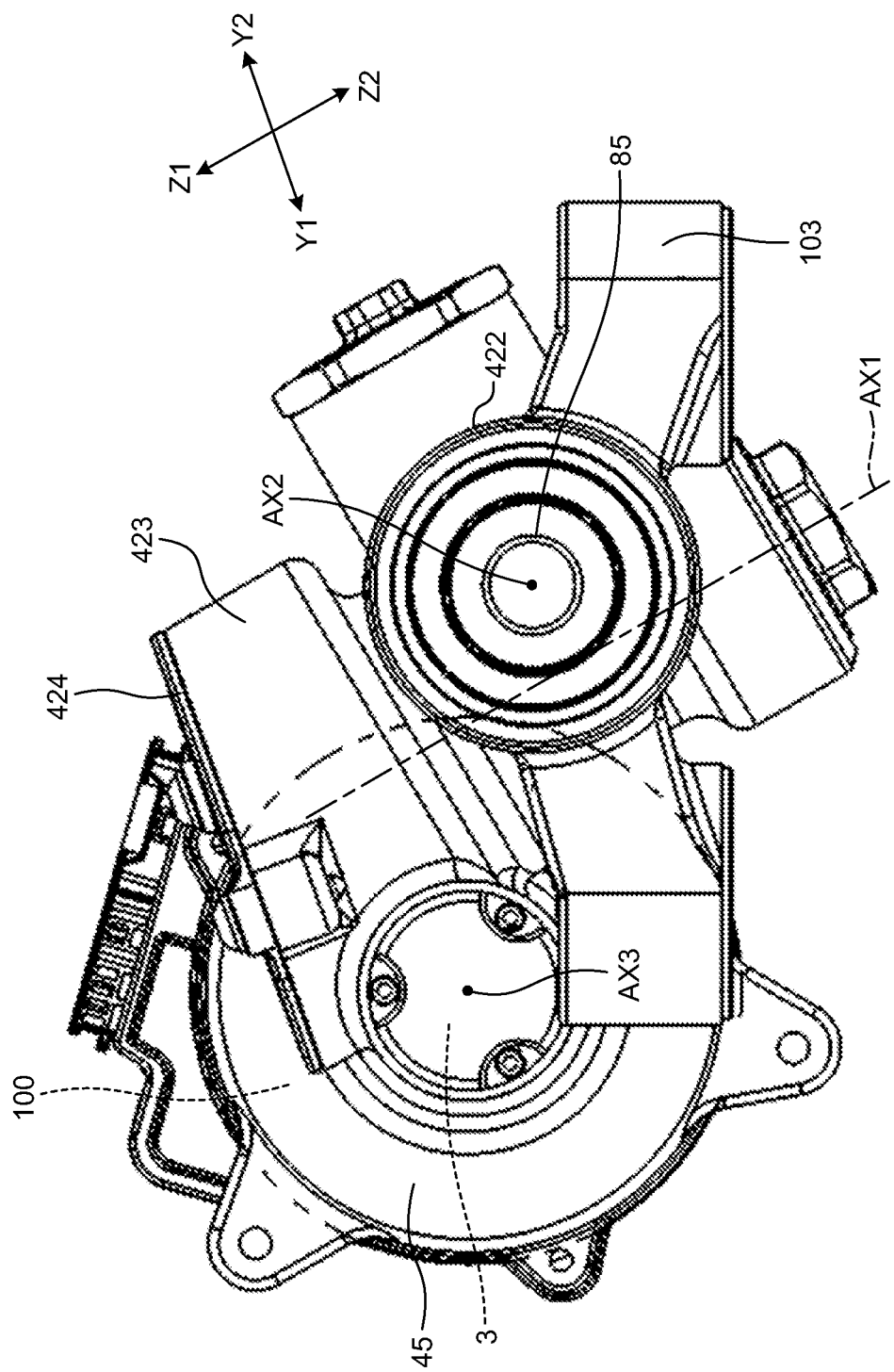
FIG. 3 is a schematic view of FIG. 2 as viewed from the X1 side.
Figure 4:
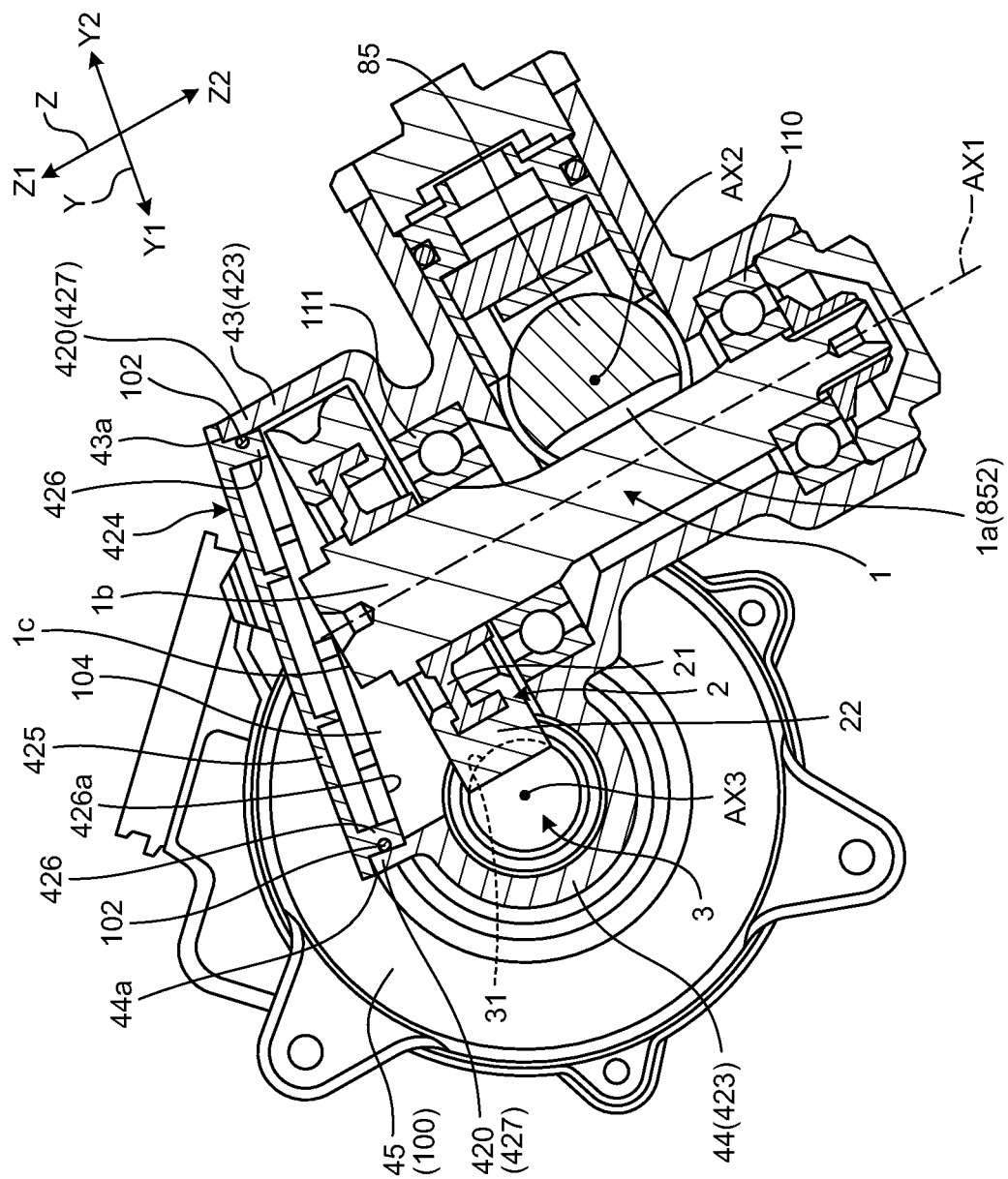
FIG. 4 is a sectional view taken along the line IV-IV in FIG. 2.
Figure 5:
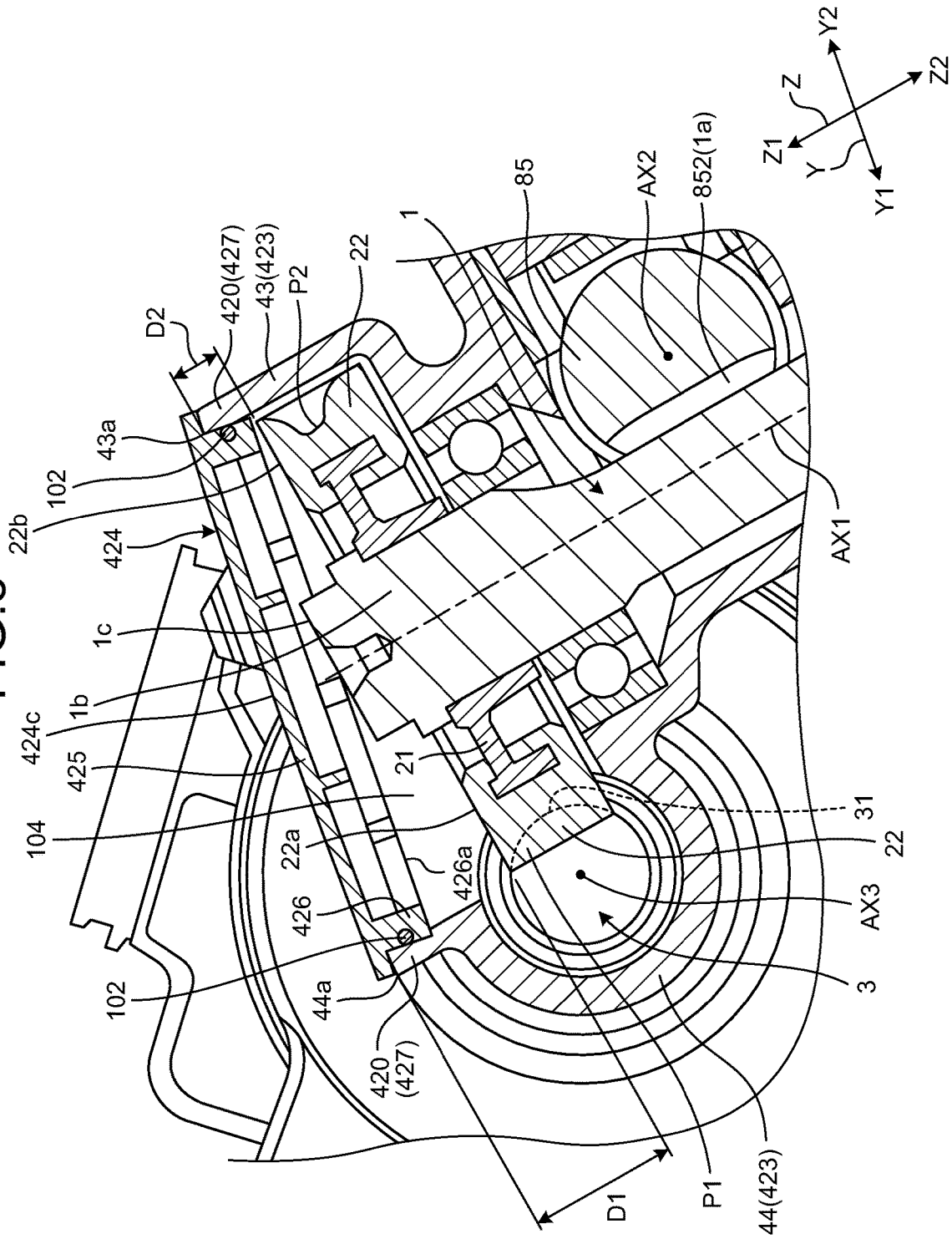
FIG. 5 is a partially enlarged sectional view of FIG. 4.

The electric power steering device according to the embodiment will be described. FIG. 1 is a schematic view of the electric power steering device according to the embodiment. FIG. 2 is a partial perspective view of FIG. 1. FIG. 3 is a schematic view of FIG. 2 as viewed from the X1 side. FIG. 4 is a sectional view taken along the line IV-IV of FIG. 2. FIG. 5 is a partially enlarged sectional view of FIG. 4.

As illustrated in FIG. 1, an electric power steering device 80 includes a steering wheel 81, a first steering shaft 82, a second steering shaft 83, a steering pinion shaft 84, a rack shaft 85, a tie rod 86, an assist pinion shaft 1, a worm wheel 2, a worm shaft 3, an electric motor 100, a first housing 41, and a second housing 42. For example, the electric power steering device 80 is what is called a dual pinion type steering device.

As illustrated in FIG. 1, the steering wheel 81 is coupled to the first steering shaft 82, and the first steering shaft 82 is coupled to the second steering shaft 83 via a universal joint 821. The second steering shaft 83 is coupled to the steering pinion shaft 84 via a universal joint 831. Pinion teeth 841 are formed on the outer periphery of the lower end part of the steering pinion shaft 84.

As illustrated in FIG. 1, the rack shaft 85 extends in the X direction (first direction). In this example, if the central axis of the rack shaft 85 is a central axis AX2, the axial direction of the central axis AX2 is along the X direction (first direction). That is, the rack shaft 85 extends in the axial direction of the central axis AX2, and is rotatable in the axial rotation direction of the central axis AX2. For example, the X direction (first direction) is the vehicle width direction of a vehicle. Among a plurality of parts of the rack shaft 85, rack teeth 851 are provided on the outer periphery on the X2 side. The rack teeth 851 mesh with the pinion teeth 841 of the steering pinion shaft 84. Among the parts of the rack shaft 85, rack teeth 852 are provided on the outer periphery on the X1 side. The rack teeth 852 mesh with pinion teeth 1a of the assist pinion shaft 1. Both end parts of the rack shaft 85 on the X1 side and the X2 side are coupled to a wheel 101 via the tie rod 86.

As described above, the steering wheel 81 is coupled to the steering pinion shaft 84 via the first steering shaft 82 and the second steering shaft 83. Consequently, when the driver applies steering torque to the steering wheel 81 in the left or right direction, the steering torque is transmitted to the steering pinion shaft 84 via the first steering shaft 82 and the second steering shaft 83. Then, because the pinion teeth 841 of the steering pinion shaft 84 mesh with the rack teeth 851, the steering torque is converted into a force that moves the rack shaft 85 in the X direction.

Moreover, a steering torque sensor, which is not illustrated, detects the steering torque applied to the steering wheel 81, and a controller, which is not illustrated, supplies electric current to the electric motor 100 according to the detected steering torque. When the electric current is supplied to the electric motor 100, assist torque generated by the electric motor 100 is transmitted to the assist pinion shaft 1, which is connected to the electric motor 100 via the worm wheel 2 and the worm shaft 3, and an assist force that moves the rack shaft 85 connected to the assist pinion shaft 1 in the X direction is generated.

That is, by driving the electric motor 100 according to the steering torque generated by steering the steering wheel 81, it is possible to assist the rack shaft 85 to move in the X direction.

As illustrated in FIG. 1 and FIG. 2, the rack shaft 85, the steering pinion shaft 84, the assist pinion shaft 1, the worm wheel 2, the worm shaft 3, and the electric motor 100 are housed in the first housing 41 and the second housing 42. The first housing 41 is located on the X2 side, and the second housing 42 is located on the X1 side. A flange 411 is provided on the end part of the first housing 41 on the X1 side, and a flange 421 is provided on the end part of the second housing 42 on the X2 side. By fixing the flange 411 and the flange 421, the first housing 41 and the second housing 42 are coupled to each other. Moreover, as illustrated in FIG. 2, a vehicle body mounting member 103 is attached to each of the end part of the first housing 41 on the X2 side and the end part of the second housing 42 on the X1 side. A through hole 103a is provided on the vehicle body mounting member 103, and a fastening member (for example, a bolt) is inserted into the through hole 103a. That is, by fastening the fastening member to the vehicle body after inserting the fastening member through the through hole 103a, the first housing 41 and the second housing 42 are attached to the vehicle body. As illustrated in FIG. 1, a speed reduction mechanism 200 including the worm wheel 2 and the worm shaft 3 is housed inside a speed reducer housing part 423, which is a part of the second housing 42.

As illustrated in FIG. 2 and FIG. 3, the rack shaft 85 is housed inside a rack shaft housing part 422 of the second housing 42. As illustrated in FIG. 4, the assist pinion shaft 1 and the worm wheel 2 are housed inside the speed reducer housing part 423 that extends from the rack shaft housing part 422 to the Z1 side. The worm shaft 3 and the electric motor 100 are disposed on the Y1 side with respect to the assist pinion shaft 1 and the worm wheel 2. The assist pinion shaft 1, the worm wheel 2, and the worm shaft 3 will be described in detail below.

As illustrated in FIG. 4 and FIG. 5, the assist pinion shaft 1 extends in the axial direction (second direction, Z direction) of a central axis AX1. The second direction (Z direction) is a direction intersecting the first direction (X direction). The assist pinion shaft 1 is rotatable in the axial rotation direction of the central axis AX1. The pinion teeth 1a are provided on the outer periphery on one side (Z2 side) of the assist pinion shaft 1 in the axial direction (second direction, Z direction). The one side (Z2 side) of the assist pinion shaft 1 in the axial direction is rotatably supported by the speed reducer housing part 423 (casing) via a bearing 110. The other side (Z1 side) of the assist pinion shaft 1 in the axial direction is rotatably supported by the speed reducer housing part 423 (casing) via a bearing 111.

As illustrated in FIG. 4 and FIG. 5, on the other side (Z1 side) of the assist pinion shaft 1 in the axial direction, the worm wheel 2 is attached to the Z1 side than the bearing 111. That is, the worm wheel 2 is attached to an end part 1b of the assist pinion shaft 1 on the other side in the second direction. The worm wheel 2 has a core metal part 21 and wheel teeth 22. For example, the core metal part 21 is formed of metal, and is formed in an annular shape along the axial rotation direction of the central axis AX1. The wheel teeth 22 are provided on the outer peripheral side of the core metal part 21. For example, the wheel teeth 22 are formed of resin. The wheel teeth 22 are formed in an annular shape along the axial rotation direction of the central axis AX1.

As illustrated in FIG. 4 and FIG. 5, the worm shaft 3 is disposed on the Y1 side, which is one side in the Y direction (third direction) with respect to the worm wheel 2. That is, the worm shaft 3 is located on the opposite side of the rack shaft 85, with the assist pinion shaft 1 interposed therebetween. The worm shaft 3 has shaft teeth 31 that mesh with the wheel teeth 22. The worm shaft 3 extends in the axial direction of a central axis AX3, and is rotatable in the axial rotation direction of the central axis AX3. The worm shaft 3 is rotated by the driving force of the electric motor 100.

As illustrated in FIG. 4 and FIG. 5, the speed reducer housing part 423 (casing) houses the worm shaft 3, the worm wheel 2, and the assist pinion shaft 1. An opening part 104 is provided on the inner peripheral side of a casing end part 427 in the speed reducer housing part 423 (casing) on the other side (Z1 side) in the second direction (Z direction).

Specifically, as illustrated in FIG. 5, the casing end part 427 on the Z1 side of the speed reducer housing part 423 (casing) has an annular part 420. The annular part 420 is formed in an annular shape along the axial rotation direction of the central axis AX1 (see FIG. 7). The opening part 104 is covered by the lid member 424.

In this example, as illustrated in FIG. 5, among a plurality of parts of the wheel teeth 22, a first part P1 is a part that meshes with the shaft teeth 31. Among the parts of the wheel teeth 22, a second part P2 is a part located on the opposite side of the first part P1, with the central axis AX1 interposed therebetween. Moreover, in the speed reducer housing part 423 (casing), a part located on the Y1 side (first part P1 side) with respect to the central axis AX1 is referred to as a motor-side housing part 44. In the speed reducer housing part 423 (casing), a part located on the Y2 side (second part P2 side) with respect to the central axis AX1 is referred to as an opposite-motor-side housing part 43. An end surface 22a is provided on the end of the first part P1 on the Z1 side. The end surface 22a extends perpendicular to the central axis AX1. An end surface 22b is provided on the end of the second part P2 on the Z1 side. The end surface 22b extends perpendicular to the central axis AX1.

Then, as illustrated in FIG. 5, first distance D1 is the distance between the end surface 22a and a tip end 44a on the Z1 side of the casing end part 427 in the motor-side housing part 44 along the Z direction. Second distance D2 is the distance between the end surface 22b and a tip end 43a on the Z1 side of the casing end part 427 in the opposite-motor-side housing part 43 along the Z direction. The first distance D1 is greater than the second distance D2. In other words, the second distance D2 is smaller than the first distance D1.

Moreover, as illustrated in FIG. 5, the lid member 424 has a lid main body part 425 and a protrusion part 426. The lid main body part 425 is formed in a disc shape that covers the opening part 104. The protrusion part 426 is formed in an annular shape that protrudes from the peripheral part of the lid main body part 425 toward the Z2 side. The protrusion part 426 is disposed on the inner peripheral side of the annular part 420. An annular-shaped O-ring 102 that extends in the peripheral direction is provided between the outer periphery of the protrusion part 426 and the annular part 420. Specifically, a concave groove recessed inwardly (inner peripheral side) in the radial direction is provided on the outer periphery of the protrusion part 426, and the O-ring 102 is housed inside the concave groove. As illustrated in FIG. 5, when viewed from the X direction, a tip end 426a on the Z2 side of the protrusion part 426 is a straight line that extends in the Y direction. An end surface 1c on the Z1 side of the assist pinion shaft 1 extends perpendicular to the central axis AX1. The tip end 426a on the Z2 side of the protrusion part 426 intersects with the end surface 1c.

Figure 6:
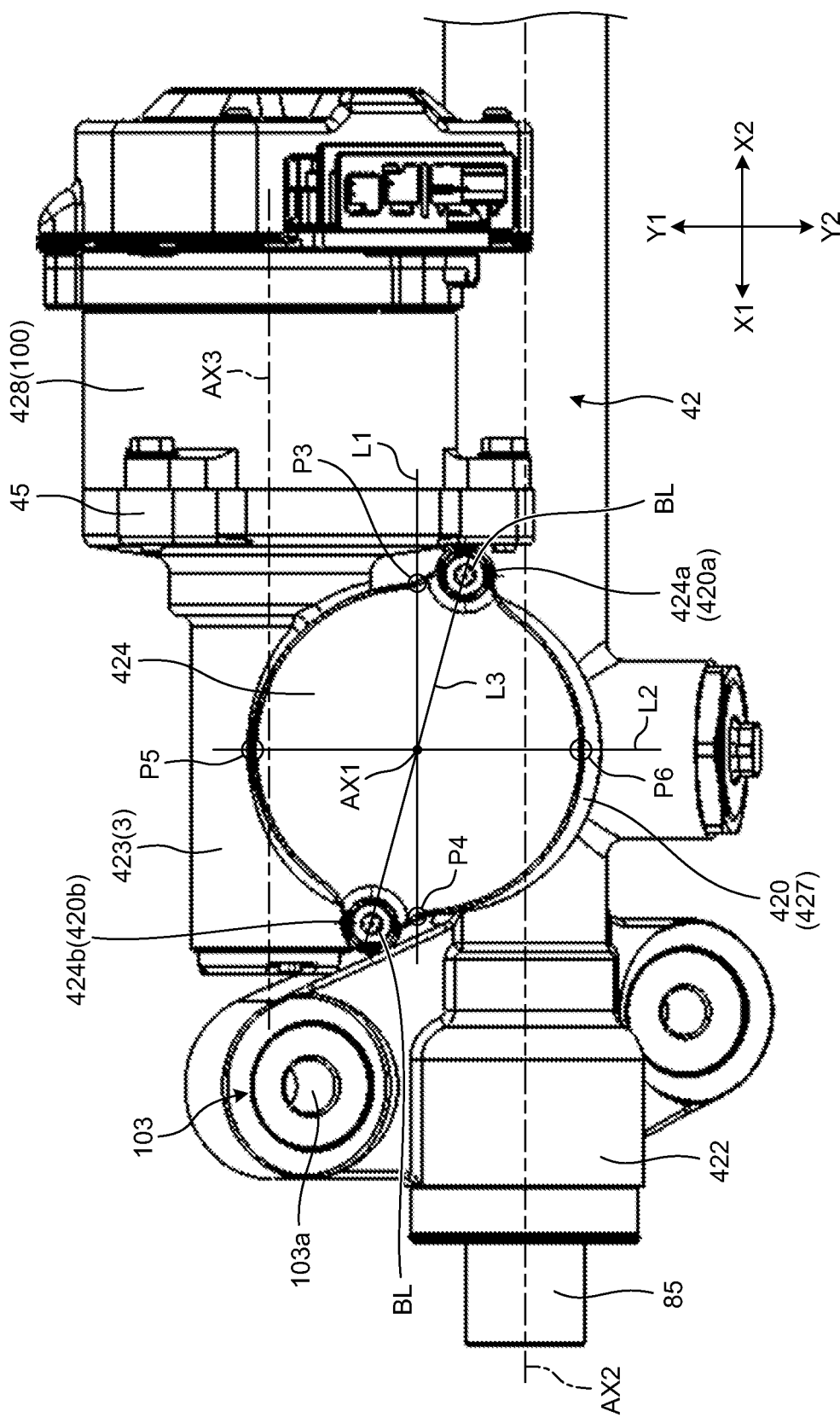
FIG. 6 is a partial schematic view of FIG. 2 as viewed from the Z1 side.
Figure 7:
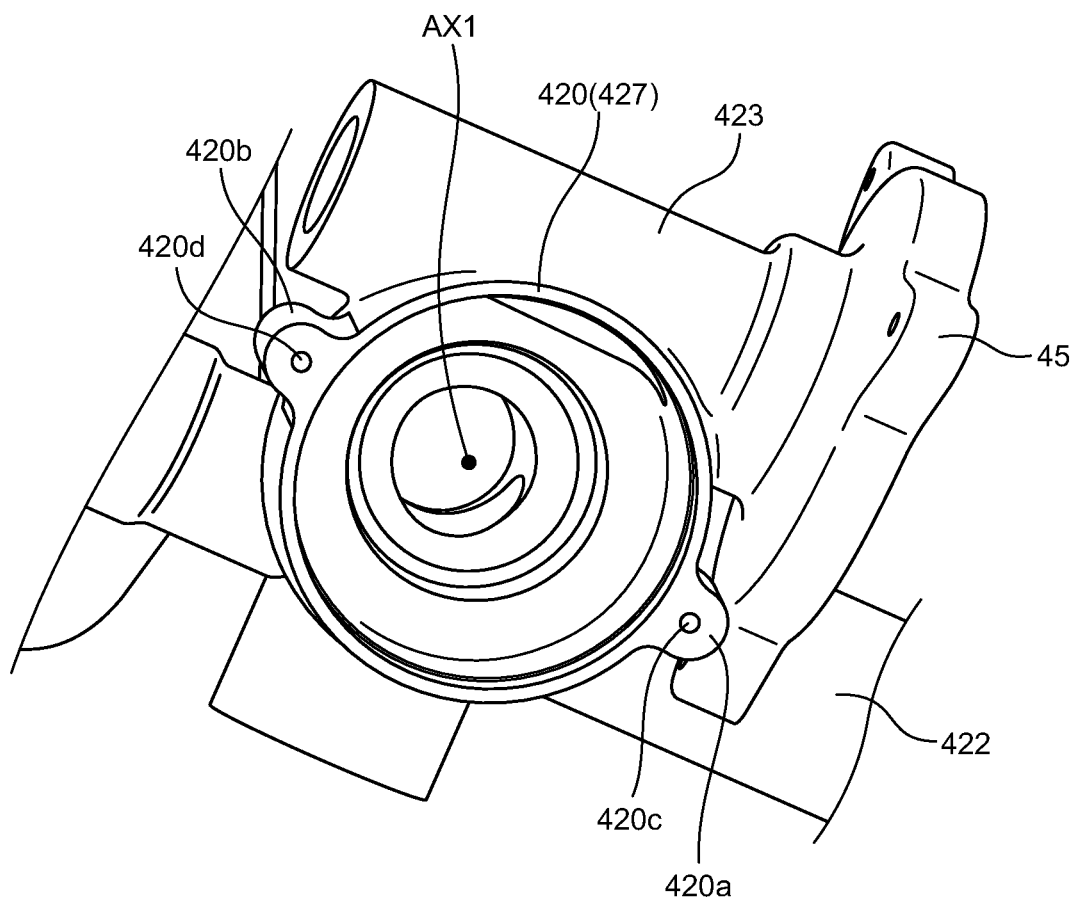
FIG. 7 is a partial schematic view of FIG. 6 when a lid member is removed.
Figure 7:
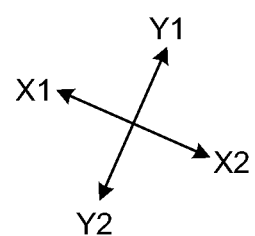

FIG. 6 is a partial schematic view of FIG. 2 as viewed from the Z1 side. FIG. 7 is a partial schematic view of FIG. 6 when a lid member is removed. In FIG. 6, the axial direction of the central axis AX1 is slightly shifted from the Z direction (second direction). That is, the central axis AX1 is not completely orthogonal to the paper surface of FIG. 6, and in FIG. 6, an intersection between the central axis AX1 and the upper surface of the lid member 424 is illustrated as a point of AX1.

As illustrated in FIG. 7, the casing end part 427 on the Z1 side of the speed reducer housing part 423 (casing) has the annular part 420 and flanges 420a and 420b. The annular part 420 extends annularly along the axial rotation direction of the central axis AX1. The flanges 420a and 420b protrude outwardly in the radial direction from the annular part 420. The lid member 424 can be attached to the flanges 420a and 420b. A bolt hole 420c is provided on the flange 420a, and a bolt hole 420d is provided on the flange 420b. Among a plurality of parts of the annular part 420, the flanges 420a and 420b are disposed on parts excluding a third part P3, a fourth part P4, a fifth part P5, and a sixth part P6. The locations of the third part P3 to the sixth part P6 will be described with reference to FIG. 6.

In FIG. 6, the lid member 424 is attached above the annular part 420 and the flanges 420a and 420b in FIG. 7. Flanges 424a and 424b are provided on the lid member 424. The flange 424a is fastened on the flange 420a via a bolt BL. The flange 424b is fastened on the flange 420b via a bolt BL.

As illustrated in FIG. 6, a straight line that extends in the X direction (first direction) through the central axis AX1 is referred to as a first straight line L1. A straight line that extends in the Y direction (third direction) through the central axis AX1 is referred to as a second straight line L2. The third part P3 and the fourth part P4 are intersection parts of the first straight line L1 and the annular part 420 when viewed from the Z direction. The third part P3 is on the X2 side with respect to the central axis AX1, and the fourth part P4 is on the X1 side with respect to the central axis AX1. A straight line that connects between the center of the bolt BL for fastening the flange 424a and the flange 420a, and the center of the bolt BL for fastening the flange 424b and the flange 420b, is referred to as a third straight line L3. The fifth part P5 and the sixth part P6 are intersection parts of the second straight line L2 and the annular part 420 when viewed from the Z direction. The fifth part P5 is on the Y1 side with respect to the central axis AX1, and the sixth part P6 is on the Y2 side with respect to the central axis AX1. When viewed from the Z direction (second direction), the fifth part P5 overlaps with the first part P1, and the sixth part P6 overlaps with the second part P2.

Consequently, the flanges 420a and 420b are disposed in a range from the third part P3 to the sixth part P6, a range from the sixth part P6 to the fourth part P4, a range from the fourth part P4 to the fifth part P5, and a range from the fifth part P5 to the third part P3, along the peripheral direction of the annular part 420. In other words, when viewed from the surface of the lid member 424, the first straight line L1 and the third straight line L3 intersect with each other at a predetermined angle.

Moreover, as illustrated in FIG. 6, a motor containing housing 428 is fixed to a motor mounting plate 45. The electric motor 100 is attached to the motor mounting plate 45, and housed inside the motor containing housing 428. The motor mounting plate 45 extends in the Y direction. In this example, if the flange 420a is disposed on the third part P3, the flange 420a is brought close to the motor mounting plate 45. Hence the separation distance between the annular part 420 and the motor mounting plate 45 must be increased.

As described above, the electric power steering device 80 according to the present embodiment includes the rack shaft 85 that extends in the X direction (first direction), and the outer periphery of which is provided with the rack teeth 852; the assist pinion shaft 1 the outer periphery of which on the Z2 side (one side) in the Z direction (second direction) is provided with the pinion teeth 1a; the worm wheel 2 attached to the end part on the Z2 side of the assist pinion shaft 1, and the outer periphery of which is provided with the wheel teeth 22; the worm shaft 3 that has the shaft teeth 31 meshing with the wheel teeth 22, and that is rotated by the driving force of the electric motor 100; and the speed reducer housing part 423 (casing) that houses the worm shaft 3 and the worm wheel 2, and the inner peripheral side of the end part of which on the Z1 side is provided with the opening part 104. Among the parts of the wheel teeth 22, the first part P1 is a part that meshes with the shaft teeth 31, and among the parts of the wheel teeth 22, the second part P2 is a part located on the opposite side of the first part P1, with the central axis AX1 of the assist pinion shaft 1 interposed therebetween. In a cross-section including the central axis AX1 of the assist pinion shaft 1, the first part P1, and the second part P2, the first distance D1 from the end surface 22a on the Z1 side of the first part P1 to the tip end 44a of the casing end part 427 located on the first part P1 side with respect to the central axis AX1 is greater than the second distance D2 from the end surface 22b on the Z1 side of the second part P2 to the tip end 43a of the casing end part 427 located on the second part P2 side with respect to the central axis AX1.

Thus, in the electric power steering device 80 according to the present embodiment, the first distance D1 is greater than the second distance D2. In other words, the second distance D2 is smaller than the first distance D1. In contrast, in Patent Literature 1, the second distance and the first distance are equal to each other. To reduce the size of the electric power steering device 80, it is preferable to dispose the tip ends 43a and 44a of the casing end part 427 as low as possible (on Z2 side). However, in Patent Literature 1, the lid member (cover member) is disposed substantially parallel to the worm wheel. Hence, in Patent Literature 1, the lid member cannot be brought close to the worm wheel, and it is difficult to reduce the height of the housing. However, in the present embodiment, the height of the wall surface of the opening part 104 on the speed reducer housing part 423 (casing) (second distance D2 based on the wheel teeth 22) at a location away from the worm shaft 3 is made lower than the height of the wall surface of the opening part 104 on the speed reducer housing part 423 (casing) (first distance D1 based on the wheel teeth 22) at a location close to the worm shaft 3. That is, according to the present embodiment, it is possible to prevent the speed reducer housing part 423 (casing) from protruding upward (Z1 side) at a location away from the worm shaft 3.

In other words, because the opening part 104 is disposed in an inclined manner when viewed from the Y direction, by making the height of the tip end 43a lower than that of the tip end 44a, it is possible to reduce the height of the speed reducer housing part 423 (casing) than that in Patent Literature 1. Thus, in the present embodiment, it is possible to provide the electric power steering device 80 smaller in size.

The lid member 424 that covers the opening part 104 is provided on the casing end part 427 of the speed reducer housing part 423 (casing). The casing end part 427 has the annular part 420 that extends along the axial rotation direction of the central axis AX1, and the flanges 420a and 420b that protrude outwardly in the radial direction from the annular part 420. The lid member 424 can be attached to the flanges 420a and 420b. Among the parts of the annular part 420, the flanges 420a and 420b are disposed on parts excluding the third part P3, the fourth part P4, the fifth part P5, and the sixth part P6. When viewed from the Z direction (second direction), the third part P3 and the fourth part P4 are the intersection parts of the first straight line L1 that extends in the X direction (first direction) through the central axis AX1 and the annular part 420, and the fifth part P5 and the sixth part P6 are the intersection parts of the second straight line L2 that extends in the Y direction (third direction) through the central axis AX1 and the annular part 420. The fifth part P5 overlaps with the first part P1, and the sixth part P6 overlaps with the second part P2.

Thus, in the present embodiment, among the parts of the annular part 420, the flanges 420a and 420b provided on the annular part 420 of the speed reducer housing part 423 (casing) are disposed on parts excluding the third part P3, the fourth part P4, the fifth part P5, and the sixth part P6.

For example, it is assumed that the bolt BL (fastening member) is used to attach the lid member 424 to the flanges 420a and 420b. That is, for example, the lid member 424 is attached to the flanges 420a and 420b using the bolt BL, by fastening the bolt BL to the flanges 420a and 420b after inserting the bolt BL through the through hole on the lid member 424 from the upper side (the other side in the second direction) of the lid member 424.

First, when viewed from the vertical direction (Z direction, second direction), the fifth part P5 overlaps with the first part P1, and the sixth part P6 overlaps with the second part P2. If the flanges 420a and 420b are provided on the sixth part P6, among the parts on the upper surface of the lid member 424, the bolt BL protrudes upward from the part corresponding to the sixth part P6. Hence, the height of the speed reducer housing part 423 (casing) on the sixth part P6 side and the second part P2 side is increased by the protruding portion of the bolt BL. Consequently, the fifth part P5 and the sixth part P6 are not desirable parts to dispose the flanges 420a and 420b. Moreover, for example, a member including the motor mounting plate 45 of the electric motor 100 is disposed in the vicinity of the third part P3 and the fourth part P4. Consequently, if the flanges 420a and 420b are provided on the third part P3 or the fourth part P4, the flanges 420a and 420b may interfere with the motor mounting plate 45. Hence, the third part P3 and the fourth part P4 are not desirable parts to dispose the flanges 420a and 420b. In this manner, the flanges 420a and 420b are preferably disposed on parts excluding the third part P3, the fourth part P4, the fifth part P5, and the sixth part P6.

The lid member 424 has the lid main body part 425 that covers the opening part 104, and the annular protrusion part 426 that protrudes from the peripheral part of the lid main body part 425 toward the Z2 side. The protrusion part 426 is disposed on the inner peripheral side of the casing end part 427. The annular O-ring 102 that extends in the peripheral direction is provided between the outer periphery of the protrusion part 426 and the casing end part 427.

Thus, while the protrusion part 426 is inserted into the inner peripheral side of the casing end part 427 of the speed reducer housing part 423 (casing), the O-ring 102 is provided between the protrusion part 426 and the inner periphery of the casing end part 427. That is, the inner periphery of the casing end part 427 and the protrusion part 426 are sealed by a shaft seal of the O-ring 102. In this process, it is also conceivable to apply a surface seal with the O-ring 102 between the upper surface of the casing end part 427 and the lid member 424. However, for example, if an upward (the other side in the second direction) force is applied to the lid member 424, the lid member 424 slightly separates from the casing end part 427 in the upward direction, thereby reducing the sealing effect of the surface seal. In this manner, as in the present embodiment, it is preferable to seal between the inner periphery of the speed reducer housing part 423 (casing) and the protrusion part 426 with the shaft seal of the O-ring 102.

When viewed from the X direction (first direction), the tip end 426a on the Z2 side of the protrusion part 426 intersects with the end surface 1c on the Z1 side of the assist pinion shaft 1.

To reduce the size of the electric power steering device 80, it is preferable to dispose the lid member 424 as low as possible (on one side in the second direction). Consequently, it is possible to further reduce the size of the electric power steering device 80, when the lower end (tip end 426a) of the protrusion part 426 intersects with the end surface 1c (end surface on the other side in the second direction) on the upper side of the assist pinion shaft 1, when viewed from the X direction (first direction), as in the present embodiment, than when the lower end (tip end 426a) of the protrusion part 426 does not intersect with the end surface 1c on the upper side of the assist pinion shaft 1.

It is preferable that the worm shaft 3 is located on the opposite side of the rack shaft 85, with the assist pinion shaft 1 interposed therebetween. If the worm shaft 3 is located on the rack shaft 85 side of the assist pinion shaft 1, the size of the electric power steering device 80 may be increased because many parts are disposed on the rack shaft 85 side in a concentrated manner. Consequently, it is possible to further reduce the size of the electric power steering device 80, by disposing the rack shaft 85 on one side and disposing the worm shaft 3 on the other side, with the assist pinion shaft 1 interposed therebetween.

REFERENCE SIGNS LIST 1 assist pinion shaft
1a pinion teeth
1b end part
1c end surface
2 worm wheel
3 worm shaft
21 core metal part
22 wheel teeth
22a, 22b end surface
31 shaft teeth
41 first housing
42 second housing
43 opposite-motor-side housing part
43a tip end
44 motor-side housing part
44a tip end
45 motor mounting plate
80 electric power steering device
81 steering wheel
82 first steering shaft
83 second steering shaft
84 steering pinion shaft
85 rack shaft
86 tie rod
100 electric motor
101 wheel
102 O-ring
103 vehicle body mounting member
103a through hole
104 opening part
200 speed reduction mechanism
411 flange
420 annular part
420a, 420b flange
420c, 420d bolt hole
421 flange
422 rack shaft housing part
423 speed reducer housing part
424 lid member
424a, 424b flange
424c upper surface
425 lid main body part
426 protrusion part
426a tip end
427 casing end part
428 motor containing housing
821 universal joint
831 universal joint
841 pinion teeth
851 rack teeth
852 rack teeth
AX1 central axis
AX2 central axis
AX3 central axis
BL bolt
D1 first distance
D2 second distance
L1 first straight line
L2 second straight line
L3 third straight line
P1 first part
P2 second part
P3 third part
P4 fourth part
P5 fifth part
P6 sixth part

The invention claimed is:

1. An electric power steering device, comprising:
a rack shaft that extends in a first direction, and an outer periphery of which is provided with rack teeth;
an assist pinion shaft that extends in a second direction intersecting with the first direction, and an outer periphery of which on one side in the second direction is provided with pinion teeth that mesh with the rack teeth;
a worm wheel attached to an end part on another side in the second direction of the assist pinion shaft, and an outer periphery of which is provided with wheel teeth;
a worm shaft that has shaft teeth meshing with the wheel teeth, and that is rotated by a driving force of an electric motor; and
a casing that houses the worm shaft and the worm wheel, and an inner peripheral side of a casing end part of which on the other side in the second direction is provided with an opening part, wherein
among a plurality of parts of the wheel teeth, a first part is a part that meshes with the shaft teeth, and among the parts of the wheel teeth, a second part is a part located on an opposite side of the first part with a central axis of the assist pinion shaft interposed therebetween,
in a cross section including the central axis of the assist pinion shaft, the first part, and the second part,
a first distance from an end surface on the other side in the second direction of the first part to a tip end of the casing end part located on the first part side with respect to the central axis of the assist pinion shaft is greater than second distance from an end surface on the other side in the second direction of the second part to a tip end of the casing end part located on the second part side with respect to the central axis of the assist pinion shaft,
a lid member that covers the opening part is provided on the casing end part of the casing,
the casing end part of the casing includes an annular part that extends along an axial rotation direction of the central axis of the assist pinion shaft, and a flange that protrudes outwardly in a radial direction from the annular part,
the lid member is attachable to the flange,
among a plurality of parts of the annular part, the flange is disposed on a part excluding a third part, a fourth part, a fifth part, and a sixth part, and
when viewed from the second direction, the third part and the fourth part are intersection parts of a first straight line that extends in the first direction through the central axis of the assist pinion shaft and the annular part, the fifth part overlaps with the first part, and the sixth part overlaps with the second part.

2. The electric power steering device according to claim 1, wherein
   the lid member includes a lid main body part that covers the opening part and an annular protrusion part that protrudes on the one side in the second direction from a peripheral part of the lid main body part,
   the protrusion part is disposed on an inner peripheral side of the casing end part, and
   an annular O-ring that extends in a peripheral direction is provided between an outer periphery of the protrusion part and the casing end part.

3. The electric power steering device according to claim 2, wherein when viewed from the first direction, an end on the one side in the second direction of the protrusion part intersects with an end surface on the other side in the second direction of the assist pinion shaft.

4. The electric power steering device according to claim 1, wherein the worm shaft is located on an opposite side of the rack shaft, with the assist pinion shaft interposed therebetween.

* * * * *